Patented Nov. 20, 1951

2,575,423

UNITED STATES PATENT OFFICE 2,575,423

PROCESS OF MANUFACTURING STARCH SOLUTIONS

Jan Lolkema, Hoogezand, and Willem Albertus van der Meer, Haren, Netherlands, assignors to Naamlooze Vennootschap: W. A. Scholten's Chemische Fabrieken, Groningen, Netherlands, a corporation of the Netherlands No Drawing. Application November 1, 1946, Serial No. 707,321. In the Netherlands October 22, 1943

Section 1, Public Law 690, August 8, 1946
Patent expires October 22, 1963

4 Claims. (Cl. 260—17.2)

U. S. Patent 2,246,635 contains the description of a process of manufacturing starch products the solutions of which when dried will produce water resistant layers, the said process being characterized by adding to the cold swelling starch an aldehyde, particularly formaldehyde, or a substance producing formaldehyde by decomposition, and of manufacturing solutions of such starch products.

For the manufacture of cold swelling starch a mixture of starch or a starch derivative with a limited proportion of water is heated on a rotary drum to a temperature adapted to remove the water and to gelatinize the starch or starch derivative while pressing the same to a thin layer under mechanical pressure and simultaneously drying the mass.

The patent mentioned above is based upon the discovery that, if an aldehyde, more particularly formaldehyde, is added to the mixture to be submitted to the cold swelling starch manufacturing process, no insoluble condensation products of the starch and the aldehyde will be formed as yet during the short heating period at a high temperature. This is shown by the fact that the cold swelling starch manufactured in the presence of an aldehyde has the property of dissolving or swelling in cold water, like ordinary cold swelling starch.

Insoluble products, however, are formed when dissolving the formaldehyde-cold swelling starch in water, drying the solution in the heat preferably in the presence of a catalyst, and subsequently, heating the dried layer for some time, at a higher temperature if necessary. By using the said starch products one may therefore obtain in a very simple manner water resistant layers, which will constitute very valuable finishing, sizing and binding agents, or adhesive substances.

The formation of the insoluble products with formaldehyde is due, most likely, to the formation of "bridges," e. g. methylene ether bridges between the starch molecules, whereby the solubility of the cold swelling starch is destroyed. In this case the formaldehyde may react with two hydroxyl groups of the same and/or of different starch molecules, thus forming intramolecular and/or intermolecular bridges.

The formation of the said methylene-ether bridges is accelerated by the presence of catalysts, particularly acids. The decrease of the solubility is a function of the proportion of formaldehyde and of the nature and the proportion of the acid, as well as of the other reaction conditions, such as the concentration and the temperature and the length of the heating period.

In actual practice commercial formaline is employed for the manufacture of formaldehyde-cold swelling starches according to U. S. Patent 2,246,635. It is well known, that formaline generally contains a small quantity of acid (formic acid). The native starch itself may also have a slightly acid reaction on account of the acids present in the said starch, such as amylo-phosphoric acid. It has now been found that this small proportion of acid will already cause during the cold swelling starch manufacturing process a certain degree of condensation accompanied by a reduced solubility, and, most likely, with formation of methylene ether bridges. It is true that this condensation does not proceed so far that the product obtained will no longer swell in cold water, but this will only be true as long as one does not use too large a proportion of commercial formalin. It is therefore stated in U. S. Patent 2,246,635 that as a rule not more than 10% of formaldehyde, calculated on the starch, should be used, if it is desired to obtain preparations that will still swell in water in a satisfactory manner.

According to the present invention it is now possible to obtain even more readily dissolving, or swelling, products by carrying out the heating process for manufacturing the aldehyde-cold swelling starch in a neutral or alkaline medium, and the invention accordingly has for its object a process of manufacturing aldehyde cold swelling starches of the character indicated, which consists in heating a mixture of starch with a small proportion of water and an aldehyde capable of producing insoluble condensation products with the starch on a rotary drum at a temperature adapted to remove the water and to gelatinize the starch, while pressing out the mass under mechanical pressure to a thin layer which is simultaneously dried, the said heating process being carried out in a non-acid medium.

When neutralizing the free acid present in the commercial formaline used or both in the formaline and in the starch, it will be found that there is formed a cold swelling starch that is more readily soluble than the cold swelling starches produced without previously neutralizing the acid. This improved solubility is particularly noticeable if a larger proportion of formaldehyde is used and it is possible in this manner to obtain a readily soluble cold swelling starch while using a considerable quantity of formaldehyde, e. g. 40%, calculated as pure aldehyde on air dry starch. The use of these large proportions of aldehyde has substantial advantages, as the layers thus formed are more resistant to water than those obtained with the aid of cold swelling starch produced with a smaller proportion of formaldehyde.

Another advantage of the use of larger quantities of aldehyde consists in that degraded starch products, such as soluble starch, may be used as starting materials for the cold swelling starch process, since because of the high percentage of aldehyde in the final product the layers produced from the cold swelling starches obtained in this way will still be sufficiently water resistant. Thus the type of starch material which can be used in the process claims includes starches which have been degraded or modified. In the process according to Patent No. 2,246,635 (Moller), however, it is not possible to use degraded starches, owing to the fact that the quantity of aldehyde to be added is limited, so that the layers obtained from decomposed starch products would not be sufficiently water resistant. The degraded starch products may be manufactured according to well known processes. They may also be produced during the manufacturing process of the cold swelling starch by adding before or during the said process chemicals degrading the starch.

With the same percentage of aldehyde, however, the water resistant properties of the cold swelling starches generally will be the greater, the smaller the degree of degradation of the starch molecule.

If desired the aldehyde, e. g. formaldehyde, may be allowed to react for some time in an acid medium on the starch and the reaction mixture subsequently neutralized or rendered alkaline, before the same is subjected to the cold swelling starch process.

For the manufacture of aldehyde cold swelling starches in a neutral or an alkaline medium according to the invention, one may apply all of the measures described in U. S. Patent 2,246,635.

When using a solution of the cold swelling starch products as finishing, sizing or binding agent or as adhesive, it is advisable to add an acid catalyst for the condensation of the cold swelling starch and the aldehyde. The catalyst used for this purpose is either an acid or a substance generating an acid when heated and the term catalyst when used in the specification and claims is to be understood in this sense. The acid catalyst may already be added to the ready aldehyde-cold swelling starch in dry condition; it is advantageous in this case to add the catalyst in the form of a cold swelling starch preparation, obtained by converting a mixture of starch and the required amount of catalyst into a cold swelling starch, so that the catalyst is embedded within the cold swelling starch particles. The ready aldehyde-cold swelling starches may also be mixed with a starch or starch derivative, which does not swell or dissolve in cold water.

It is also possible to add to the aldehyde-cold swelling starches substances adapted to form with the aldehyde synthetic resin like condensation products, e. g. phenols and the like, amino compounds, such as urea, thiourea, dicyandiamide aminotriazines, e. g. melamine and the like. These substances may be added to the cold swelling starch, after the latter has been dissolved; or, if two dry cold swelling starch preparations are used, to the dry cold swelling starch containing the catalyst. We may also employ the said synthetic resin components separately, together with starch in the form of cold swelling starch. In that case they may be added during or after the cold swelling manufacturing process. If they are added before or during the cold swelling starch manufacturing process, so that they are embedded within cold swelling starch particles, it is of particular advantage to use melamine as the synthetic resin component, as it has been found that it is possible to add melamine in very large quantities to the moist starch without experiencing any difficulties during the manufacturing process of the cold swelling starch in question, owing to the stability and to the very high melting point (354° C.) of the melamine.

In a contra-distinction from melamine, synthetic resin components, such as urea and phenol which have a comparatively low melting point, will melt at the temperature at which the conversion of starch into cold swelling starch takes place. It will consequently be necessary to limit the quantity of compounds of this nature to be added to the starch, in order to obtain a final product of the cold swelling starch manufacturing process which is still useful or sufficiently soluble. The use of melamine as a synthetic resin component, moreover, has the great advantage that after the drying of the finishing or sizing agent or adhesive layers will be obtained which in comparison with the layers produced from other synthetic resin components, are highly resistant to water or to washing.

Instead of adding the aminotriazines as such, one may also use substances by which aminotriazines may be formed during the cold swelling starch process. One may for instance start from dicyandiamide by which melamine is produced, or from dicyandiamide and urea by which ammeline is produced.

As a rule it will be necessary for obtaining layers that are thoroughly resistant to water, to use larger amounts of synthetic resin in proportion to the degree of decomposition of the starch, used as a first material for the manufacture of the aldehyde-cold swelling starch.

The solutions of the cold swelling starch preparations according to the invention, are characterized by a high and permanent transparency and do not present any retrogradation or crystallization phenomena. The solubility is in many cases better than that of the ordinary cold swelling starches. Moreover they have the advantage of not being attacked by microorganisms, so that it is unnecessary to add preservatives to the solutions of the said starch preparations. They may be used for various purposes, e. g. as adhesives for sizing paper, as thickening agents for paper and textile printing, or binding agents for all kinds of granular, fibrous and pulverulent materials.

The products according to the invention, particularly those containing synthetic resin components are very suitable for being used as finishing agents for textile purposes particularly for providing finishing agents that are permanent to washing on yarns or fabrics made of cotton, linen, wool, rayon and cellulose fibres or mixtures of the same with other fibrous substances.

The textile material to be treated is dried after the impregnation with the starch solution and subsequently, if desired, heated to a higher temperature (e. g. 80–120° C.) for some minutes. The drying and heating treatments may be effected simultaneously. The yarn or fabric is then subjected to the usual further treatments.

In this manner one obtains finishing or sizing agents that are more permanent to washing than those obtained from the starch preparations formerly used.

In order to obtain special finishing or sizing effects auxiliary agents may be added to the finishing or sizing bath, such as fillers, e. g. China clay or talcum, softening agents, such as acid resistant fat emulsions, or finishing oils, water repelling agents, such as paraffin emulsions and other emulsions containing aluminum salts, without materially reducing the property of the finishing agents to resist washing.

The products according to the invention may also be used as binding agents for all kinds of pigments, which renders it possible to combine dyeing with coloured pigments and finishing in order to obtain colours that are both sun fast and permanent to washing. Brilliant rayon may be delustered in the same manner, while it is also possible to obtain a matting effect that is permanent to washing by locally applying the starch paste containing pigments by printing processes.

The invention may also be used for finishing the backside of plush and rugs (velvet and similar fabrics) in order to produce finishes which are proof against washing and will permanently fix the pile. The invention may also be used for the purpose of improving the resistance of fabrics against abrasion and wear and tear, particularly those made from cellulose staple fibre (especially when wet), whereby a general improvement of the quality is obtained.

Finally the products according to the invention, particularly those made of decomposed starch, may be used as water proof adhesives e. g. in the manufacture of three-ply or multi-ply wood and for producing finishes which do not affect the designs on dyed or printed fabrics.

The invention will be explained by the following examples.

*Example I*

500 to 1000 parts by volume of commercial formalin (40% by volume) are neutralized with dilute caustic soda and diluted to a volume of 1500 parts with water containing 6 parts by weight of dissolved anhydrous sodium carbonate. 1000 parts by weight of potato starch are suspended in the solution thus obtained and the mixture is immediately converted into cold swelling starch in the usual manner.

The suspension of starch in formalin may also be left to itself for some time at a normal or a slightly raised temperature, so that the formaldehyde may be able to react with the starch for some time, before the mixture is submitted to the cold swelling starch process. The starch will gradually dissolve completely to a very tough, transparent mass.

The same phenomenon will occur much more quickly, if a small quantity of a caustic soda solution is added instead of a small quantity of sodium carbonate. The rate of speed at which starch will swell or dissolve in a formaldehyde solution depends, apart from the temperature, on the pH and on the concentration of the formaldehyde.

The cold swelling starch preparations prepared according to this example contain from 10 to 20% of formaldehyde calculated on the air dry final product. By varying the proportions of the components and the reaction conditions it is, however, also possible to manufacture cold swelling starch preparations containing more than 20% of formaldehyde.

*Example II*

200 parts by weight of paraformaldehyde and 500 parts by weight of potato starch are suspended in 500 parts by volume of water in which there are dissolved 3 parts by weight of anhydrous sodium carbonate. The mixture is converted into cold swelling starch in the usual manner.

*Example III*

60 parts by weight of the formaldehyde-cold swelling starch prepared according to Example I are mixed while stirring with 600 parts by volume of cold water. After the cold swelling starch is sufficiently swollen, the viscous mass is diluted, while stirring vigorously, with a solution of 1 part by weight of ammonium chloride in 400 parts by volume of water. A cotton fabric is "foularded" in this mixture, pressed and submitted to a preliminary drying process. The fabric treated in this manner is heated at 120° C. for 10 minutes, whereby a washproof finish is obtained.

*Example IV*

1 kg. of the paraformaldehyde cold swelling starch obtained according to Example II is intimately mixed with 100 grams of urea or with 75 grams of melamine. 60 grams of the dry mixture are stirred with 500 cm.$^3$ of cold water. The paste is left to itself for some time, after which a mixture of 420 cm.$^3$ of water and 20 cm.$^3$ of an 80% solution of acetic acid is added. The whole is intimately mixed by vigorous stirring. A cotton fabric is impregnated with the paste thus obtained. The excess of finishing bath is removed by pressing; the fabric is dried and the condensation of the urea, or of the melamine with the formaldehyde-cold swelling starch is effected or completed by heating the fabric at a higher temperature, e. g. 60–140° C., for some minutes.

Even by repeated mechanical washing at 70–80° C. with a solution containing 5 grams of soap and 3 grams of soda per liter the finish will remain in the fabric.

*Example V*

70 parts by weight of comminuted melamine are intimately mixed with 100 parts by volume of water and subsequently diluted with a solution of 3 parts by weight of Na$_2$CO$_3$ in 650 parts by volume of water. 500 parts by weight of potato starch are suspended in this mixture and the suspension thus obtained is converted into cold swelling starch in the usual manner. 250 parts by weight of the melamine cold swelling starch obtained in this manner are intimately mixed in dry condition with 250 parts by weight of the formaldehyde cold swelling starch, obtained according to Example I. This mixture may be converted with a ten- or fifteenfold quantity of cold water into a finishing paste by means of which after the addition of a catalyst one obtains finishes that are permanent to washing.

*Example VI*

A mixture of 5.7 parts by weight of formaldehyde cold swelling starch containing 16% of formaldehyde content and 1½ parts by weight of a melamine cold swelling starch containing 21% of melamine is dissolved in 57.6 parts by volume of cold water. This solution is intimately mixed with a mixture of 6 parts by weight of talcum and 6 parts by weight of China clay, the said mixture having previously been boiled with 12 parts by volume of water. The mass is diluted while stirring with 28.4 parts by volume of water to which there have been added 2 parts by volume of an acetic acid solution of 80%. A cotton fabric is treated with the solution thus obtained, in the same manner as in Example IV. After or during the drying treatment the finished fabric is heated at 120° C. during some minutes.

The fillers and stiffening agents are practically not removed even after repeated washings in the manner described in Example IV.

Example VII 100 parts by weight of dicyandiamide and 1000 parts by weight of potato starch are suspended in a mixture of 700 parts by volume of water and 300 parts by volume of 1 N caustic soda. The suspension is submitted to the cold swelling starch process at a temperature of about 170° C. There is obtained a melamine containing cold swelling starch preparation that will readily dissolve in cold water and that in combination with a formaldehyde-cold swelling starch obtained according to Example I may be used for producing washproof finishes on fabrics.

Example VIII 500 parts by volume of a commercial formaldehyde solution of 40% are diluted with 500 parts by volume of water to which 20 parts by volume of acetic acid of 80% have been previously added. 500 parts by weight of potato starch are suspended in the acid formaldehyde solution and the suspension is kept for some hours at room temperature. The mixture is rendered weakly alkaline to phenolphtalein and converted into cold swelling starch in the usual way.

We claim:

1. A process of manufacturing formaldehyde cold swelling starches, which comprises, imparting to a mixture of a starchy material of the group consisting of starch and soluble starches, and an aqueous solution of commercial formaldehyde in a proportion of at least 20%, calculated as pure formaldehyde on air dry starch, a pH of at least 7, by adding an alkaline substance and heating the mixture on a rotary drum to a temperature adapted to remove the water and to gelatinize the starchy material, while pressing out the mass under mechanical pressure to a thin layer which is simultaneously dried.

2. A dry stable starch preparation, soluble in cold water which comprises a mixture of the product of claim 1 and separate particles of a substance taken from a group consisting of phenols, urea and amino triazines, capable of reacting with formaldehyde, so as to form synthetic resin-like condensation products.

3. A process of manufacturing formaldehyde cold swelling starches, which comprises, imparting to a mixture of a starchy material of the group consisting of starch and soluble starches, and an aqueous solution of commercial formaldehyde in a proportion of at least 40%, calculated as pure formaldehyde on air dry starch, a pH of at least 7, by adding an alkaline substance and heating the mixture on a rotary drum to a temperature adapted to remove the water and to gelatinize the starchy material, while pressing out the mass under mechanical pressure to a thin layer which is simultaneously dried.

4. A dry stable starch preparation, soluble in cold water which comprises a mixture of the product of claim 3 and separate particles of a substance taken from a group consisting of phenols, urea and amino triazines, capable of reacting with formaldehyde, so as to form synthetic resin-like condensation products.

JAN LOLKEMA.
WILLEM ALBERTUS VAN DER MEER.

REFERENCES CITED

The following references are of record in the file of this patent:

UNITED STATES PATENTS

| Number | Name | Date |
|---|---|---|
| 2,246,635 | Moller | June 24, 1941 |
| 2,275,314 | Pierson | Mar. 3, 1942 |
| 2,302,310 | Glarum | Nov. 17, 1942 |
| 2,399,489 | Landes | Apr. 30, 1946 |

FOREIGN PATENTS

| Number | Country | Date |
|---|---|---|
| 506,553 | Great Britain | May 31, 1939 |

OTHER REFERENCES

Blanksma Recuiel des travaux chimiques des Pays-Bas, vol. 48, pages 351–360 (1929) 233.3.